(12) United States Patent
Ramnani et al.

(10) Patent No.: US 9,886,499 B2
(45) Date of Patent: Feb. 6, 2018

(54) IDENTIFYING AND CLASSIFYING NON-FUNCTIONAL REQUIREMENTS IN TEXT

(71) Applicant: Accenture Global Services Limited, Dublin (IE)

(72) Inventors: Roshni R. Ramnani, Bangalore (IN);
Vibhu S. Sharma, Bangalore (IN);
Shubhashis Sengupta, Bangalore (IN);
David E. Ingram, Kent (GB); Donal P. Smith, Surrey (GB)

(73) Assignee: Accenture Global Services Limited, Dublin (IE)

( * ) Notice: Subject to any disclaimer, the term of this patent is extended or adjusted under 35 U.S.C. 154(b) by 245 days.

(21) Appl. No.: 13/975,993

(22) Filed: Aug. 26, 2013

(65) Prior Publication Data

US 2015/0058349 A1    Feb. 26, 2015

(51) Int. Cl.
*G06F 17/30* (2006.01)
(52) U.S. Cl.
CPC .............................. *G06F 17/30705* (2013.01)
(58) Field of Classification Search
None
See application file for complete search history.

(56) References Cited

U.S. PATENT DOCUMENTS

| | | | | |
|---|---|---|---|---|
| 8,825,693 | B2 * | 9/2014 | Boyce | 707/765 |
| 2007/0010993 | A1 | 1/2007 | Bachenko et al. | |
| 2009/0138793 | A1 * | 5/2009 | Verma et al. | 715/234 |
| 2010/0010800 | A1 * | 1/2010 | Rehberg | 704/9 |
| 2011/0238663 | A1 * | 9/2011 | Zhang | G06F 17/30734 707/736 |
| 2012/0272206 | A1 | 10/2012 | Sengupta et al. | |
| 2014/0040281 | A1 * | 2/2014 | Spivack et al. | 707/748 |

(Continued)

FOREIGN PATENT DOCUMENTS

| | | |
|---|---|---|
| EP | 2615553 | 7/2013 |
| GB | 2490190 | 10/2012 |

OTHER PUBLICATIONS

Hussain et al., "Using linguistic knowledge to classify non-functional requirements in SRS documents", Natural Language and Information Systems, 2008, pp. 287-298.

(Continued)

*Primary Examiner* — Syling Yen
*Assistant Examiner* — Soheila (Gina) Davanlou
(74) *Attorney, Agent, or Firm* — Harrity & Harrity, LLP

(57) ABSTRACT

A device may obtain text to be categorized, and may determine rules for categorizing portions of the text. A rule may specify text patterns to be used to categorize the portions of the text into a category, and may specify a relationship, between at least two text patterns, to be used to categorize the portions of the text into the category. The device may determine that the text patterns and the relationship between the at least two text patterns exist in a text portion. The device may categorize the text portion into the category based on determining that the text patterns and the relationship between the at least two text patterns exist in the text portion. The device may provide an indication of an association between the text portion and the category based on categorizing the text portion into the category.

20 Claims, 10 Drawing Sheets

(56) References Cited

U.S. PATENT DOCUMENTS

2014/0067370 A1* 3/2014 Brun .................................. 704/9
2015/0032751 A1* 1/2015 Ting et al. .................... 707/738

OTHER PUBLICATIONS

Cleland-Huang et al., "Automated classification of non-functional requirements." Requirements Engineering, 2007, pp. 103-120.
Mairiza et al., "An investigation into the notion of non-functional requirements", Proceedings of the 2010 ACM Symposium on Applied Computing ACM, 2010, pp. 311-317.
Temperley et al., "Link Grammer", http://www.link.cs.cmu.edu/link/, Oct. 29, 2013, 2 pages.

* cited by examiner

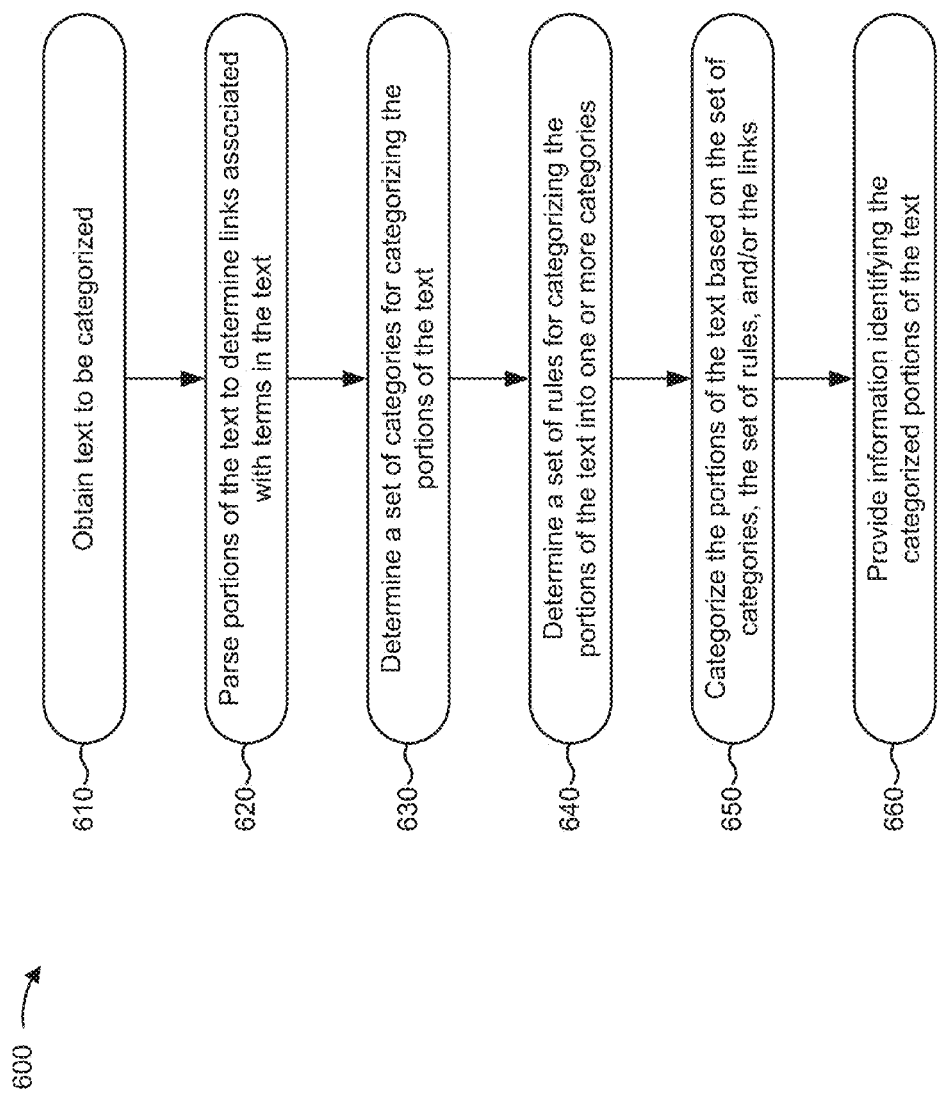

IDENTIFYING AND CLASSIFYING NON-FUNCTIONAL REQUIREMENTS IN TEXT

BACKGROUND

A requirements document may include functional requirements and non-functional requirements for a system, such as a hardware system, a network, a software program, or the like. A functional requirement may define a function of the system, such as inputs to the system, a behavior of the system, or outputs of the system. A non-functional requirement may specify criteria that can be used to judge operational characteristics of the system, such as performance criteria, security criteria, or the like.

SUMMARY

According to some possible implementations, a device-implemented method may include determining text to be categorized; determining categories for categorizing portions of the text; and determining rules for categorizing the portions of the text, where at least one rule identifies: a category, at least two text patterns to be used to categorize the portions of the text into the category, and a relationship, between the text patterns, to be used to categorize the portions of the text into the category. The device-implemented method may further include determining that a text portion includes the text patterns and the relationship between the text patterns; categorizing the text portion into the category based on determining that the text portion includes the text patterns and the relationship between the text patterns; and providing information identifying the text portion and the category based on categorizing the text portion into the category.

According to some possible implementations, a computer-readable medium may store one or more instructions that, when executed by one or more processors, cause the one or more processors to: obtain text to be categorized; and determine rules for categorizing portions of the text, where at least one rule specifies: text patterns to be used to categorize the portions of the text into a category, and a relationship, between text patterns, to be used to categorize the portions of the text into the category. The one or more instructions may further cause the one or more processors to: determine that the text patterns and the relationship between the text patterns exist in a text portion; categorize the text portion into the category based on determining that the text patterns and the relationship between the text patterns exist in the text portion; and provide an indication of an association between the text portion and the category based on categorizing the text portion into the category.

According to some possible implementations, a device may obtain text to be categorized, and may determine rules for categorizing portions of the text. A rule may specify text patterns to be used to categorize the portions of the text into a category, and may specify a relationship, between at least two text patterns, to be used to categorize the portions of the text into the category. The device may determine that the text patterns and the relationship between the at least two text patterns exist in a text portion. The device may categorize the text portion into the category based on determining that the text patterns and the relationship between the at least two text patterns exist in the text portion. The device may provide an indication of an association between the text portion and the category based on categorizing the text portion into the category.

BRIEF DESCRIPTION OF THE DRAWINGS

FIG. 6 is a flow chart of an example process for categorizing text using a set of rules.

DETAILED DESCRIPTION

The following detailed description of example implementations refers to the accompanying drawings. The same reference numbers in different drawings may identify the same or similar elements.

A system designer may create and/or use a requirements document to aid in the design of a system, such as a hardware system, a software program, a network, a product, or any other type of system. The requirements document may include functional requirements that define a function of the system, and may include non-functional requirements that specify criteria that can be used to judge operational characteristics of the system. A requirements document may be lengthy, leading to difficulties in identifying requirements included in the document. Unidentified or misidentified requirements, particularly non-functional requirements, may lead to costly rework in later stages of system development. Implementations described herein may assist a user, such as a system designer, in identifying and categorizing non-functional requirements (or other classifiable information) from a requirements document (or other text).

Figure 1:
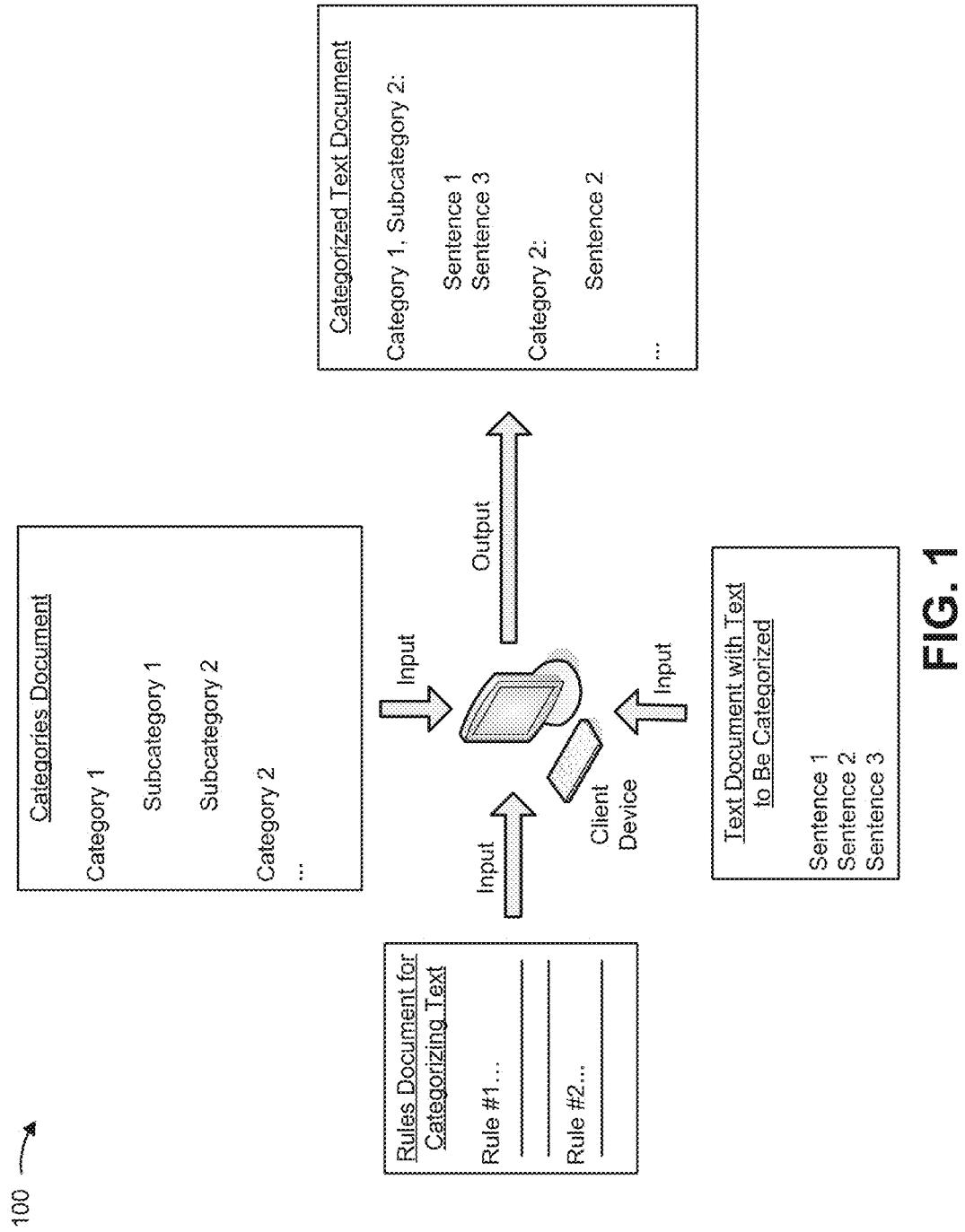
FIG. 1 is a diagram of an overview of an example implementation described herein.

FIG. 1 is a diagram of an overview of an example implementation 100 described herein. As shown in FIG. 1, a client device may receive various inputs, such as a rules document for categorizing text, a categories document that identifies categories into which the text is to be categorized, and a text document that includes text to be categorized. The rules document may include a set of rules to be applied to the text to categorize different portions of the text into categories. The categories document may identify the categories (e.g., categories and/or subcategories) into which the portions of the text are to be categorized when the text is processed according to the set of rules. The text document may include multiple portions of text, such as multiple sentences, that are to be categorized based on the set of rules and the categories.

As further shown in FIG. 1, the client device may receive (e.g., as user input) the rules document, the categories document, and the text document. The client device may process the text document by applying the rules document and the categories document to the text document. Based on processing the text document, the client device may output a categorized text document. The categorized text document may identify portions of the text document that were categorized based on applying the rules document and the categories document to the text document. For example, the categorized text document may identify a set of text portions, such as a set of sentences, and a respective category associated with each text portion in the set of text portions.

In some implementations, the text document may include a requirements document that includes non-functional requirements, the categories document may include categories for the non-functional requirements, and the rules document may include rules for categorizing the non-functional requirements into the categories. The categorized text document may identify the non-functional requirements included in the requirements document, and may identify a category associated with the identified non-functional requirements. In this way, a user may be able to view the categorized text document (e.g., via a display of the client device) to easily determine non-functional requirements associated with a system, thus aiding in system development.

Figure 2:
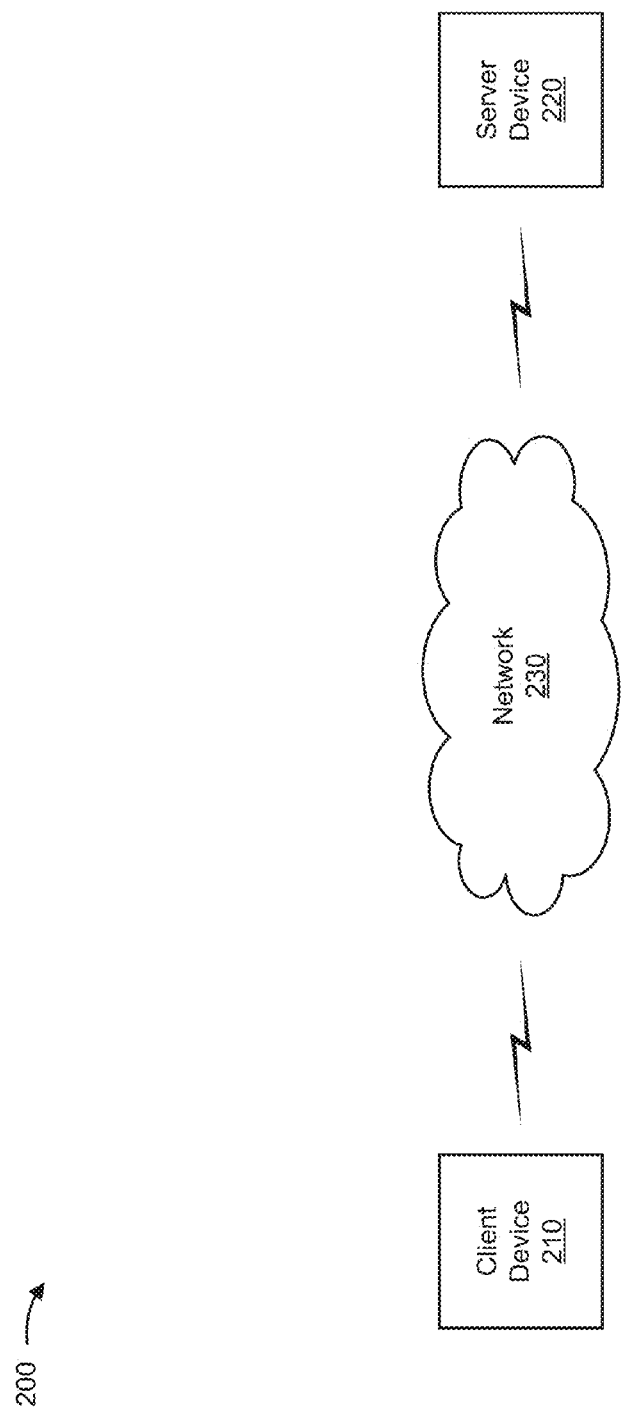
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a server device 220, and a network 230. Devices of environment 200 may interconnect via wired connections, wireless connections, or a combination of wired and wireless connections.

Client device 210 may include a device capable of receiving, generating, storing, processing, and/or providing information associated with categorizing text (e.g., a rules document, a categories document, a text document, a categorized text document, etc.). For example, client device 210 may include a computing device, such as a desktop computer, a laptop computer, a tablet computer, a handheld computer, a server, a mobile phone (e.g., a smart phone, a radiotelephone, etc.), or a similar device. Client device 210 may, for example, receive and/or identify a rules document, a categories document, and a text document, and may output a categorized text document based on processing the text document using the rules document and the categories document. In some implementations, client device 210 may receive information from and/or transmit information to server device 220 (e.g., information associated with categorizing text).

Server device 220 may include one or more devices capable of receiving, generating, storing, processing, and/or providing information associated with categorizing text. For example, server device 220 may include a computing device, such as a server, a desktop computer, a laptop computer, a tablet computer, a handheld computer, or a similar device. In some implementations, server device 220 may receive, from client device 210, a request for information associated with categorizing text, such as a request for a rules document, a categories document, a text document, or the like. Server device 220 may provide the requested information to client device 210 based on the request.

Network 230 may include one or more wired and/or wireless networks. For example, network 230 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
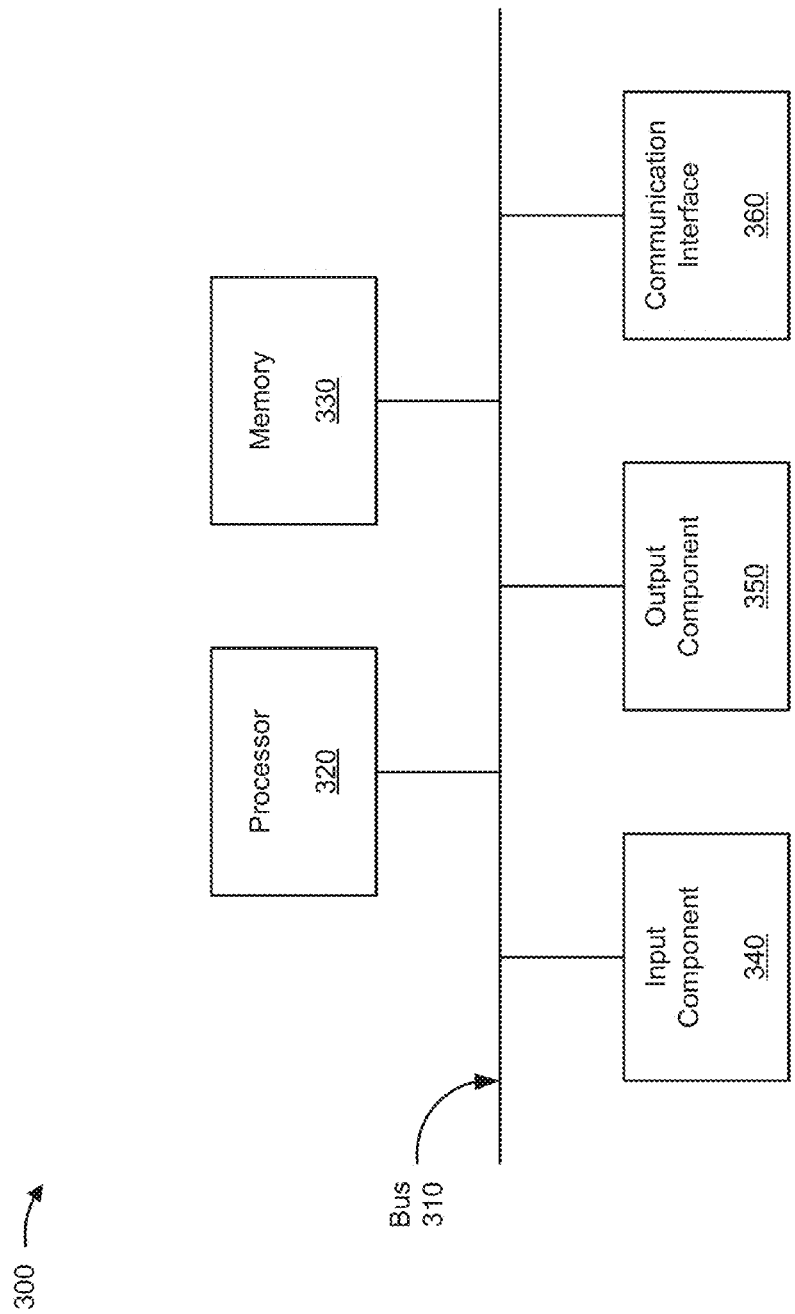
FIG. 3 is a diagram of example components of one or more devices of FIG. 2.

FIG. 3 is a diagram of example components of a device 300, which may correspond to client device 210 and/or server device 220. In some implementations, each of client device 210 and/or server device 220 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
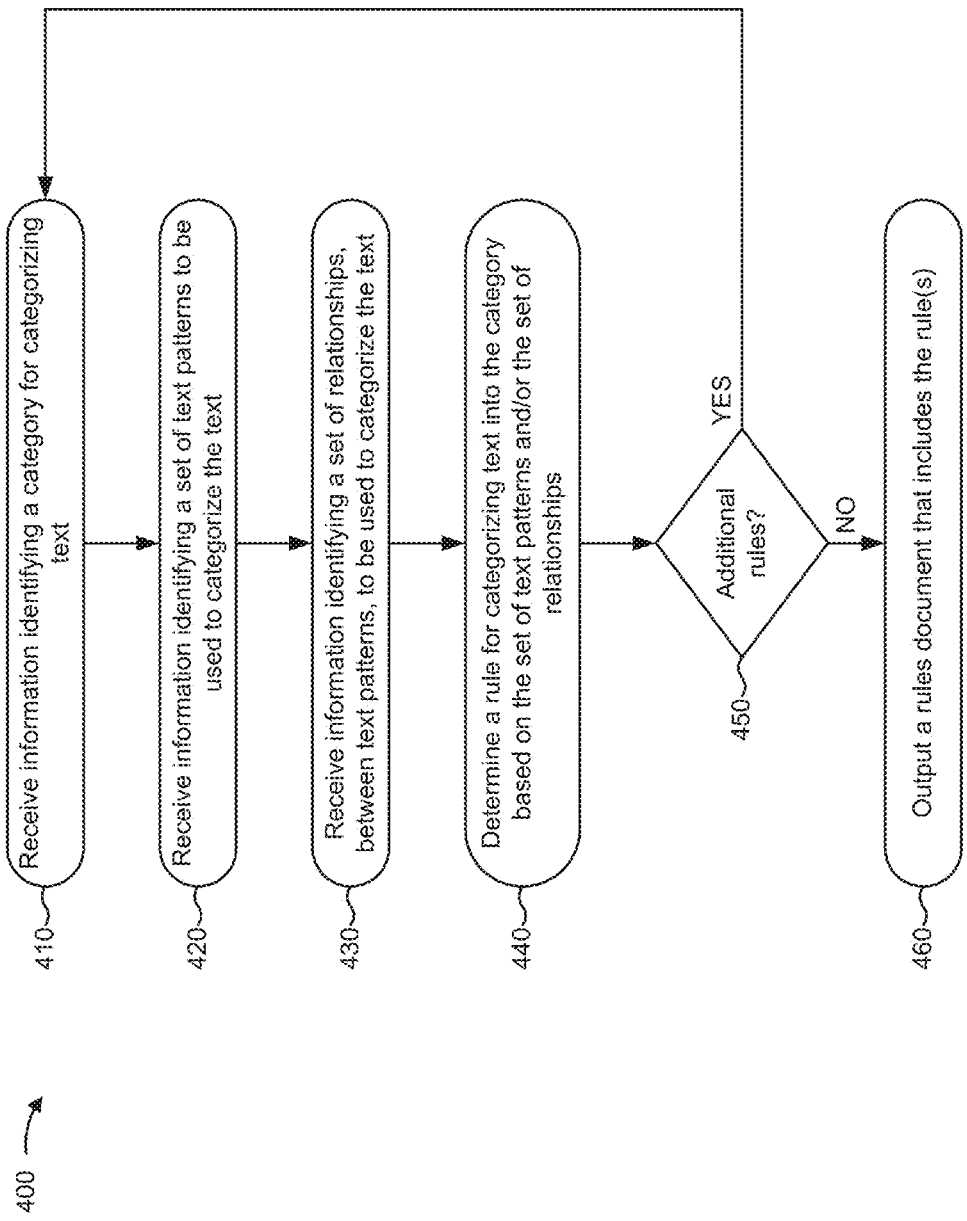
FIG. 4 is a flow chart of an example process for creating a rules document that includes a set of rules for categorizing text.

FIG. 4 is a flow chart of an example process 400 for creating a rules document that includes a set of rules for categorizing text. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving information identifying a category for categorizing text (block 410). For example, client device 210 may receive (e.g., via user input) information identifying a category for categorizing text. The category may include, for example, a category for classifying a non-functional requirement, such as performance, availability, security, or the like. In some implementations, the category may include a lower-level category (e.g., a sub-category) of a higher-level category. For example, a performance category may include sub-categories of workload (e.g., with additional sub-categories of number of users/clients, number of concurrent users/clients, arrival rate, requests per time unit, arrival distribution, inter-arrival time, think time, etc.), throughput (e.g., with additional sub-categories of requests serviced per time unit, transactions per time unit, replies per time unit, failed requests per time unit, etc.), response time (e.g., with additional sub-categories of timeout time, bounds time, latency, etc.), utilization (e.g., with additional sub-categories of user time, processing time, input/output (TO) time, disk time, elapsed time, etc.), processing capability (e.g., with additional sub-categories of number of threads, queue size, scheduling policy, service time, CPU/IO bound, RAM/memory usage, delay, number of maximum concurrent connections, thread pool, number of sockets, disk capacity, CPU speed, etc.), or the like. As another example, an availability category may include sub-categories of hours of operation, scheduled maintenance, percent availability, recovery time, disaster recovery requirements, or the like. As another example, a usability category may include sub-categories of learnability, user interface aesthetics, operability, user error protection, accessibility, compliance, standardization, internationalization, or the like.

In some implementations, client device 210 may receive information identifying the category based on user input. For example, a user may input the category via a text editor, a graphical user interface, or the like, and the input category may be provided to client device 210. In some implementations, client device 210 may provide a list of categories (e.g., via a user interface), and the user may select a category from the list. For example, client device 210 may receive a categories document (e.g., an extensible markup language (XML) document) that includes a set of categories for categorizing text. Client device 210 may provide the set of categories via a user interface, and may receive user input identifying a category, from the set of categories.

As an example, a user may input the following text, identifying a category, into a rules document:

---
When
    There is a category "workload"
...

---

The above text may indicate that a rule is to be applied to categorize text into a "workload" category (e.g., when the "workload" category exists in a categories document).

As further shown in FIG. 4, process 400 may include receiving information identifying a set of text patterns to be used to categorize the text (block 420). For example, client device 210 may receive (e.g., via user input), information identifying the set of text patterns to be used to categorize the text.

A text pattern may include a unique term, in some implementations. A term may refer to a particular combination of characters, such as a word, multiple words (e.g., a phrase, a sentence, etc.), a character, multiple characters (e.g., a character string), or the like. For example, a text pattern may include a single word, such as "simultaneous," "consecutive," "concurrent," etc. As another example, a text pattern may include a phrase, such as "round trip time," "tolerance level," "down-time," etc. Such text patterns may be referred to herein as syntactic patterns.

Additionally, or alternatively, a text pattern may include multiple different terms. The multiple terms may be identified by an indicator term (e.g., a single indicator term). For example, the indicator term <"time_unit"> may represent the terms "hour," "minute," "second," "day," "year," "millisecond," "hr," "min," "sec," and/or other terms that represent a unit of time; the indicator term <"data size"> may represent the terms, "byte," "kilobyte," "megabyte," "kB," "MB," and/or other terms that represent a data size; etc. Such text patterns may be referred to herein as semantic patterns. Other semantic patterns may include <"calendar months"> that includes terms representing a month, <"percentage"> that includes terms representing a percentage, <"number"> that includes terms representing a number, or the like. In some implementations, client device 210 may receive information (e.g., a semantic pattern document) that identifies terms represented by an indicator term.

Additionally, or alternatively, a text pattern may include a part of speech that identifies multiple different terms. The multiple terms may be identified by a part of speech tag. For example, the part of speech tag <noun> may represent terms that are nouns, such as "system," "network," "processor," etc. Such patterns may be referred to herein as part of speech patterns, and may include a noun (e.g., a subject noun, an object noun, a proper noun, etc.), a verb (e.g., a present tense verb, a past tense verb, a future tense verb, a gerund, etc.), an adjective, an adverb, a determinant, or the like.

In some implementations, a text pattern may include a part of speech of a term used in a text portion. For example, the text pattern "verb <schedule>" may indicate that the word schedule (and related words, such as "scheduling," "schedules," "scheduled," etc.) is to be used as a verb in the text portion (e.g., to satisfy a rule that includes the text pattern). Client device 210 may identify the term <"schedule"> as a verb in the text portion: "The system schedules processes for execution," and may not identify the term <"schedule"> as a verb in the text portion: "The processors consult the schedule to determine when to execute processes." Likewise, the text pattern "noun load" may indicate that the word load (and only the word load, not including related words) is to be used as a noun in the text portion. In this way, identifying parts of speech may increase the effectiveness and accuracy of categorizing text.

Additionally, or alternatively, client device 210 may receive information identifying a text pattern this is not to be included in a text portion in order for the text portion to be categorized using the category. For example, a user may provide input identifying a particular text pattern, and may provide an indication that a text portion not be categorized using a particular category when the particular text pattern appears in the text portion. If client device 210 determines that the text portion includes the particular text pattern, client device 210 may not categorize the text portion into the particular category.

In some implementations, client device 210 may receive information identifying the set of text patterns based on user input. For example, a user may input a text pattern via a text editor, a graphical user interface, or the like, and the input text pattern may be provided to client device 210. In some implementations, client device 210 may provide a list of text patterns (e.g., via a user interface), and the user may select a text pattern from the list. For example, client device 210 may receive a text patterns document that includes a set of text patterns to be used to categorize text. Client device 210 may provide the set of text patterns via a user interface, and may receive user input identifying a text pattern, from the set of text patterns.

As an example, a user may input the following text, identifying text patterns, into a rules document:

```
When
    There is a category "workload"
    There is a sentence in the text which contains patterns
        Pattern-1 "users"
        Pattern-2 <"number">
    The sentence does not contain the pattern
        Pattern-3 "calling"
    ...
```

The above text may indicate that a sentence is to be categorized into a "workload" category when the sentence includes the unique term "users," when the sentence contains a number term (e.g., "100," "one hundred," 2,000," "one million," or another number term), and when the sentence does not include the unique term "calling." As shown in this example, angle brackets (e.g., < and >) may be used to differentiate a text pattern that represents multiple terms from a text pattern that represents a single term.

As further shown in FIG. 4, process 400 may include receiving information identifying a set of relationships, between text patterns, to be used to categorize the text (block 430). For example, client device 210 may receive (e.g., via user input) information, identifying the set of relationships between text patterns, to be used to categorize the text.

A relationship may include a positional relationship that indicates an order in which text patterns are positioned (or not positioned) in the text relative to each other, in some implementations. The positional relationship may include a "before" relationship (e.g., a particular text pattern is positioned before one or more other text patterns), an "after" relationship (e.g., a particular text pattern is positioned after one or more other text patterns), a "between" relationship (e.g., a particular text pattern is positioned between a first one or more text patterns and a second one or more text patterns), or a combination of these relationships (e.g., a first text pattern is positioned before or after a second and third text pattern, a first text pattern is positioned before and after a second text pattern, etc.).

For example, a positional relationship may specify that a first text pattern is positioned before a second text pattern within the text and/or a portion of the text (e.g., within a sentence), that a first text pattern is positioned after a second text pattern, that a first text pattern is positioned within a second text pattern, etc. The positional relationship may be associated with any quantity of text patterns. For example, a positional relationship may specify that a first text pattern is positioned before a second text pattern and a third text pattern, that a first text pattern is positioned between a second text pattern and a third text pattern, etc. Additionally, or alternatively, the positional relationship may specify an order in which the text patterns are not positioned in the text relative to each other. For example, a positional relationship may specify that a first text pattern is not positioned before a second text portion, that a first text pattern is not positioned within a second text pattern, etc.

In some implementations, a relationship may include an immediate positional relationship that indicates an order in which text patterns are positioned (or are not positioned) in the text relative to each other, without intervening terms. For example, an immediate positional relationship may specify that a first text pattern is positioned immediately before a second text pattern (e.g., with no intervening terms and/or text patterns), that a first text pattern is positioned immediately after a second text pattern, etc. Additionally, or alternatively, the immediate positional relationship may specify an order in which the text patterns are not positioned in the text relative to each other, without intervening terms. For example, a positional relationship may specify that a first text pattern is not positioned immediately before a second text portion, that a first text pattern is not positioned immediately after a second text pattern, etc.

A relationship may include a grammatical relationship associated with one or more text patterns, in some implementations. For example, a grammatical relationship may specify that a first and second text pattern have a subject-verb relationship, a verb-object relationship, a subject-object relationship, etc. Additionally, or alternatively, a relationship may specify that a particular grammatical relationship is not associated with one or more text patterns. For example, a grammatical relationship may specify that a particular term is not a subject of a sentence, is not an object of the sentence, etc.

A relationship may include a sub-string relationship, in some implementations. For example, a sub-string relationship may specify that a first text pattern is a sub-string of (e.g., falls within) a second text pattern. Additionally, or alternatively, a relationship may include an indirect relationship. An indirect relationship may specify that a first text pattern is indirectly linked to a second text pattern via a third text pattern. For example, a subject of a sentence and an object of the sentence may be indirectly linked via a verb of the sentence. Additionally, or alternatively, a relationship may include a direct relationship. A direct relationship may specify that a first text pattern is directly linked to a second text pattern (e.g., without requiring a third text pattern for linkage to the second text pattern). For example, a subject of a sentence may be directly linked to a verb of the sentence. Additionally, or alternatively, a relationship may specify that one or more text patterns do not have a sub-string relationship, do not have an indirect relationship, do not have a direct relationship, etc.

In some implementations, client device 210 may receive information identifying the set of relationships based on user input. For example, a user may input a relationship via a text editor, a graphical user interface, or the like, and the input relationship may be provided to client device 210. In some implementations, client device 210 may provide a list of relationships (e.g., via a user interface), and the user may select a relationship from the list. For example, client device 210 may receive a relationships document that includes a set of relationships to be used to categorize text. Client device 210 may provide the set of relationships via a user interface, and may receive user input identifying a relationship, of the set of relationships.

As an example, a user may input the following text, identifying a relationship, into a rules document:

```
When
    There is a category "workload"
    There is a sentence in the text which contains patterns
        Pattern-1 "users"
        Pattern-2 <"number">
    Pattern-2 is before pattern-1
    ...
```

The above text may indicate that a sentence is to be categorized into a "workload" category when the sentence includes the unique term "users," when the sentence contains a number term, and when the number term precedes the term "users" (e.g., one hundred users, 20 users, etc.).

As further shown in FIG. 4, process 400 may include determining a rule for categorizing text into the category based on the set of text patterns and/or the set of relationships (block 440). For example, client device 210 may determine the rule based on the set of text patterns and/or the set of relationships. The rule may be used to categorize a portion of the text when the portion of the text satisfies a specified set of text patterns and/or a specified set of relationships between text patterns.

For example, the rule may include an existence of a set of text patterns in the portion of the text, such that the portion of the text is categorized into a specified category when the set of text patterns exists (e.g., appears) in the portion of the text. As another example, the rule may include an existence of a set of relationships between a set of text patterns in the portion of the text, such that the portion of the text is categorized into a specified category when the set of relationships between the set of text patterns exists in the portion of the text.

In some implementations, a rule may specify a threshold quantity and/or percentage of text patterns and/or relationships that must be met for client device 210 to categorize a portion of text into the category. For example, a user may provide input indicating that if at least half of the specified text patterns exist in a sentence, and at least three of the specified relationships are satisfied by the sentence, then client device 210 is to categorize the sentence into a particular category.

As an example, a user may input the following text into a rules document:

```
When
    There is a category "workload"
    There is a sentence in the text which contains patterns
        Pattern-1 "users"
        Pattern-2 <"number">
    Pattern-2 is before Pattern-1
    Pattern-1 and Pattern-2 are not consecutive
    The sentence does not contain patterns:
        Pattern-3 "calling"
Then
    Output "workload" category
End
```

The above text may indicate that a sentence is to be categorized into a "workload" category when the sentence includes the unique term "users," when the sentence contains a number term, when the number term precedes the term "users" (e.g., one hundred users, 20 users, etc.), when the number term does not immediately precede the term "users" (e.g., the terms are not consecutive), and when the sentence does not include the unique term "calling."

As further shown in FIG. 4, process 400 may include determining whether there are additional rules to be received (block 450). For example, client device 210 may determine (e.g., based on user input) whether there are additional rules to be received and/or included in a rules document. In some implementations, a user may indicate that the user has finished inputting rules by interacting with an input mechanism (e.g., a button on a user interface).

If there are additional rules to be received (block 450—YES), then process 400 may return to block 410, and client device 210 may receive additional categories, text patterns, and/or relationships to determine the additional rules.

If there are no additional rules to be received (block 450—NO), then process 400 may include outputting a rules document that includes the rule(s) (block 460). For example, client device 210 may output a rules document that includes the determined and/or received rules. Client device 210 may output the rules document by storing the rules document (e.g., in a memory associated with client device 210), by providing the rules document to another device (e.g., server device 220), by providing the rules document for display (e.g., via a display of client device 210), or the like.

In some implementations, the rules document may be written in a domain-specific language that uses natural language to specify the rules. The domain-specific language may include language-specific terms that indicate a particular type of text pattern, a particular type of relationship, a particular instruction to be executed by client device 210, or the like. For example, a language-specific term may indicate the start of a rule (e.g., "Rule#1"), may indicate that subsequent language in the rule represents a condition (e.g., a text pattern, a relationship, etc.) to be applied to the text (e.g., "When," "If," etc.), may indicate that subsequent language in the rule identifies a category to be processed (e.g., "There is a category X", where X represents the category), may indicate that subsequent language in the rule identifies a text pattern to be processed (e.g., "There is a text portion that contains patterns: . . . "), may indicate an identifier for a text pattern (e.g., "pattern-1"), may indicate that a particular text pattern is a semantic text pattern (e.g., <"A">, where A is a term), may indicate that a particular text pattern is a syntactic text pattern (e.g., "A", where A is a term), may indicate that subsequent language in the rule identifies a relationship to be processed (e.g., "Where Y . . . ", "These Y, Z . . . ", where Y and Z are text patterns), may indicate a type of relationship to be determined between text patterns (e.g., a positional relationship, an immediate positional relationship, a grammatical relationship, etc.), may indicate that client device 210 is to categorize text in a particular category when conditions in the rule are satisfied (e.g., "Then Output X category", where X represents the category), may indicate the end of a rule (e.g., "End Rule#1"), etc.

In this way, client device 210 may receive user input to create a rules document that includes rules for categorizing text into categories based on text patterns and relationships between the text patterns. Client device 210 may process the text, using the rules document, to categorize portions of the text into the categories, as described herein in connection with FIG. 6.

Although FIG. 4 shows example blocks of process 400, in some implementations, process 400 may include additional blocks, different blocks, fewer blocks, or differently arranged blocks than those shown in FIG. 4. Additionally, or alternatively, two or more of the blocks of process 400 may be performed in parallel.

Figure 5:
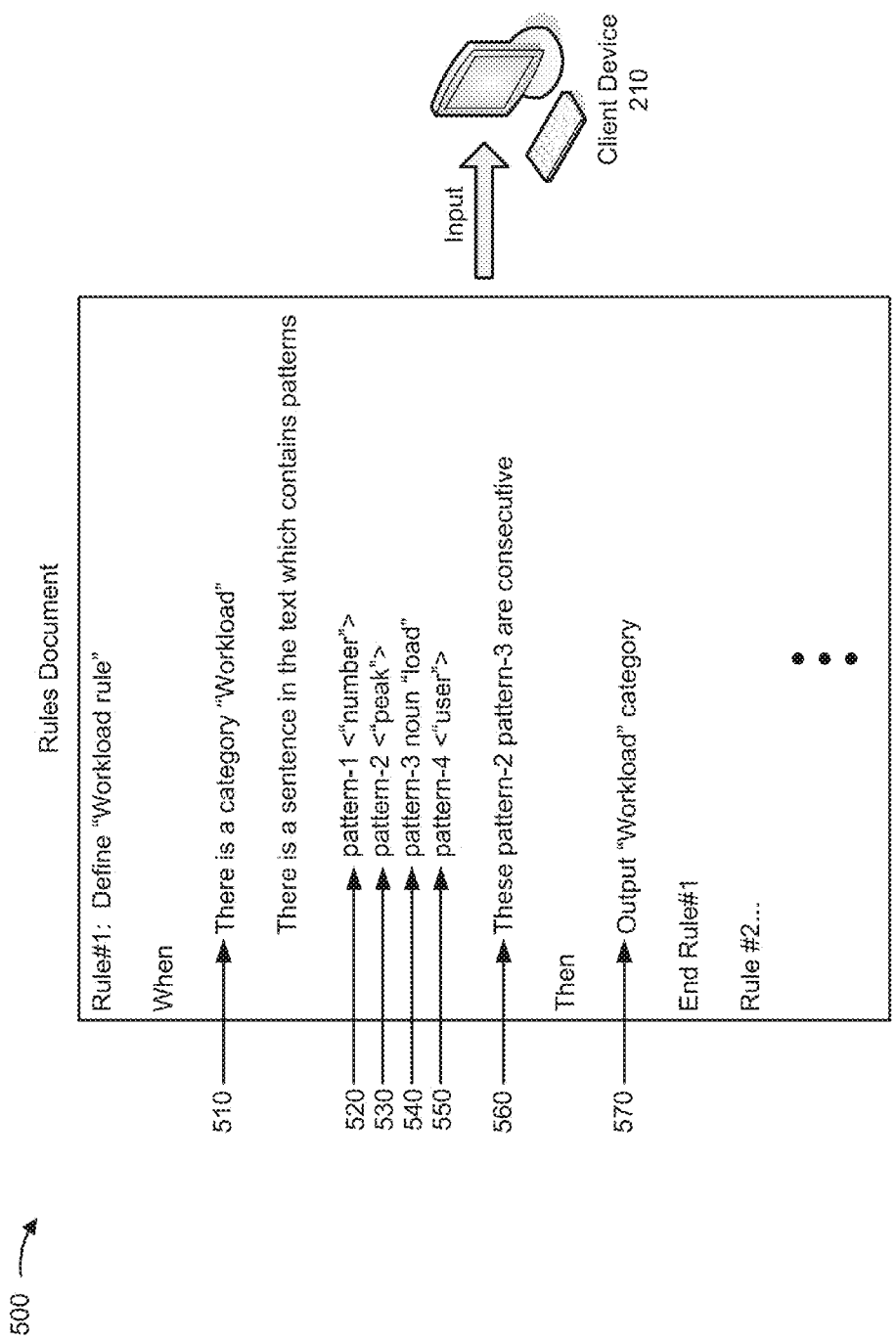
FIG. 5 is a diagram of an example implementation relating to the example process shown in FIG. 4.

FIG. 5 is a diagram of an example implementation 500 relating to example process 400 shown in FIG. 4. FIG. 5 depicts an example rules document that may be input by a user into client device 210.

As shown, the example rules document includes a rule identified as "Rule#1", which applies when there is a category identified as "Workload" (reference number 510). Rule#1 specifies text patterns 520-550 and relationship 560, which must exist in a particular sentence before client device 210 categorizes the sentence into the "Workload" category.

Assume that text pattern 520 (e.g., <"number">) will cause client device 210 to determine whether there is a term represented by a "number" indicator in the sentence, such as "500," "10,000," "one million," etc. Further, assume that text pattern 530 (e.g., <"peak">) will cause client device 210 to determine whether there is a term represented by a "peak" indicator in the sentence, such as "peak," "average," "maximum," "minimum," etc. Further, assume that text pattern 540 (e.g., noun "load") will cause client device 210 to determine whether the term "load" is present in the sentence, and whether the term "load" is used as a noun in the sentence. Further, assume that text pattern 550 (e.g., <"user">) will cause client device 210 to determine whether there is a term represented by a "user" indicator in the sentence, such as "user," "designer," "developer," "person," "people," "admin," "customer," "client," "guest," etc. Further, assume that relationship 560 will cause client device 210 to determine whether pattern 530 (e.g., pattern-2) and pattern 540 (e.g., pattern-3) appear consecutively in the text (e.g., a <"peak"> term appears immediately before or after the noun term "load" in the sentence, with no intervening text patterns).

As shown by reference number 570, if client device 210 determines that text patterns 520-550 are present in the sentence, and that relationship 560 between text patterns 530 and 540 is satisfied (e.g., exists) in the sentence, then client device 210 outputs an indication that the sentence is associated with the "Workload" category.

The rules document may include additional rules (not shown). As further shown in FIG. 5, the rules document may be provided to client device 210. For example, a user may create the rules document using a text editor, and may save the rules document in a memory of client device 210.

As indicated above, FIG. 5 is provided merely as an example. Other examples are possible and may differ from what was described with regard to FIG. 5. For example, example implementation 500 is directed to categorizing text portions into non-functional requirement categories. In some implementations, client device 210 may categorize the text portions into categories associated with another area of discourse (e.g., sports statistics, medical research, etc.).

FIG. 6 is a flow chart of an example process 600 for categorizing text using a set of rules. In some implementations, one or more process blocks of FIG. 6 may be performed by client device 210. In some implementations, one or more process blocks of FIG. 6 may be performed by another device or a group of devices separate from or including client device 210, such as server device 220.

As shown in FIG. 6, process 600 may include obtaining text to be categorized (block 610). For example, client device 210 may receive a request, from a user of client device 210, to access text to be categorized. The request may include information identifying the text, such as a name of a text document that includes the text, or information identifying a memory location at which the text document is stored. The memory location may be located within client device 210 or external to, and possibly remote from, client device 210. Client device 210 may, based on receiving the request, retrieve the text document from the memory location. In some implementations, client device 210 may provide, for display, a user interface that depicts all or a portion of the text included in the text document.

As further shown in FIG. 6, process 600 may include parsing portions of the text to determine links associated with terms in the text (block 620). For example, client device 210 may parse one or more portions of the text to determine one or more links associated with terms in the text. A portion of text may refer to one or more pages of the text, one or more sections of the text (e.g., text associated with a section heading), one or more sentences of the text, one or more terms in the text, one or more tables in the text, one or more portions of a table (e.g., one or more rows, columns, cells, etc.), or the like. In some implementations, client device 210 may determine portions of text to be parsed based on, for example, labels included in the text (e.g., a requirements label, a non-functional requirements label, a heading, etc.), a type of text portion (e.g., parsing tables in the text, parsing particular sections of the text, etc.), keywords included in the text (e.g., text portions that include a category and/or sub-category term, such as "performance," "response time," etc., a text portion that includes a numeric value, a cardinal number, an adjective, an adverb, etc.), a name of the text document (e.g., a name that includes a keyword, such as "non-functional requirements," "NFR," etc.), or the like. Additionally, or alternatively, client device 210 may determine portions of the text to be parsed based on user input identifying the text portions.

In some implementations, client device 210 may tokenize the text to segment the text into tokenized terms. The tokenized terms may include an indication of a part of speech associated with the tokenized term. Client device 210 may parse the tokenized terms (e.g., using a link parser, a dependency parser, or the like) to determine one or more links between tokenized terms. A link may indicate a grammatical relationship between terms, such as a subject-verb relationship, a verb-object relationship, a subject-object relationship, a subject-predicate relationship, a modifier-noun relationship, a modifier-verb relationship, a determinant-noun relationship, or the like. Additionally, or alternatively, a link may indicate another type of relationship between terms (e.g., a positional relationship, a direct relationship, an indirect relationship, etc.). Client device 210 may store an indication of a link and the tokenized terms with which the link is associated.

Additionally, or alternatively, client device 210 may lemmatize the text to determine a lemma (e.g., a root term, a canonical form, a dictionary form, etc.) of one or more terms in the text. Client device 210 may use the lemma of the term when applying the set of rules to the text. For example, client device 210 may use the lemma "load" when the terms "loading," "loaded," "loads," etc. appear in the text.

As further shown in FIG. 6, process 600 may include determining a set of categories for categorizing the portions of the text (block 630). For example, client device 210 may determine a set of categories to be used to categorize the text portions. In some implementations, client device 210 may determine the set of categories based on user input. For example, client device 210 may receive a request, from a user of client device 210, to access a categories document that identifies the set of categories. The request may include information identifying the categories document, such as a name of the categories document, or information identifying a memory location at which the categories document is stored. The memory location may be located within client device 210 or external to, and possibly remote from, client device 210. Client device 210 may, based on receiving the request, retrieve the categories document from the memory location. In some implementations, client device 210 may provide, for display, a user interface that depicts all or a portion of the categories document. Additionally, or alternatively, client device 210 may use a default (e.g., pre-specified) set of categories without requiring end-user input to identify the set of categories.

The set of categories may include a hierarchy of categories, in some implementations. The hierarchy of categories may include, for example, one or more levels of categories, such as a top-level category, a second-level category that falls within a top-level category, a third-level category that falls within a second-level category, etc.

As further shown in FIG. 6, process 600 may include determining a set of rules for categorizing the portions of the text into one or more categories (block 640). For example, client device 210 may determine a set of rules for categorizing the text portions into one or more categories of the determined set of categories. In some implementations, client device 210 may determine the set of rules based on user input. For example, client device 210 may receive a request, from a user of client device 210, to access a rules document that identifies the set of rules. The request may include information identifying the rules document, such as a name of the rules document, or information identifying a memory location at which the rules document is stored. The memory location may be located within client device 210 or external to, and possibly remote from, client device 210. Client device 210 may, based on receiving the request, retrieve the rules document from the memory location. In some implementations, client device 210 may provide, for display, a user interface that depicts all or a portion of the rules document. Additionally, or alternatively, client device 210 may use a default (e.g., pre-specified) set of rules without requiring end-user input to identify the set of rules. In some implementations, the rules document may include a set of rules determined as described herein in connection with FIG. 4.

As further shown in FIG. 6, process 600 may include categorizing the portions of the text based on the set of categories, the set of rules, and/or the links (block 650). For example, client device 210 may categorize the text portions using the set of categories, the set of rules, and/or the determined links between terms in the text.

In some implementations, client device 210 may categorize a text portion by applying a rule to the text portion. The rule may identify a category (e.g., "when there is a 'workload' category . . . "). When a rule identifies a category, client device 210 may determine whether the category is included in the determined set of categories for categorizing the text portion (e.g., whether the category is identified in the categories document). If the category is included in the set of categories, client device 210 may continue processing the rule. Otherwise, client device 210 may determine another rule to process (e.g., a next rule in the rules document).

The rule may identify one or more text patterns, in some implementations. For example, the rule may identify one or more syntactic patterns, one or more semantic patterns, one or more part of speech patterns, or the like, as described herein in connection with FIG. 4. Client device 210 may determine if an identified text pattern exists in the text portion. If the text pattern exists in the text portion, client device 210 may continue processing the rule. Otherwise, client device 210 may determine another rule to process (e.g., a next rule in the rules document).

In some implementations, the rule may specify a threshold quantity of text patterns that must exist in the text portion (e.g., a discrete quantity of text patterns, a percentage of text patterns identified in the rule, etc.). In this case, client device 210 may process multiple text patterns to determine whether the threshold quantity of text patterns exists in the text portion. If the threshold quantity of text patterns exists in the text portion, client device 210 may continue processing the rule. Otherwise, client device 210 may determine another rule to process (e.g., a next rule in the rules document).

The rule may identify one or more relationships between text patterns, in some implementations. For example, the rule may identify one or more positional relationships, one or more immediate positional relationships, one or more grammatical relationships, or the like, as described herein in connection with FIG. 4. Client device 210 may determine if an identified relationship exists in the text portion. If the relationship exists in the text portion, client device 210 may continue processing the rule. Otherwise, client device 210 may determine another rule to process (e.g., a next rule in the rules document). In some implementations, client device 210 may determine whether a relationship (e.g., a grammatical relationship) exists based on one or more links determined between terms, based on parsing the text portions.

In some implementations, the rule may specify a threshold quantity of relationships that must exist in the text portion (e.g., a discrete quantity of relationships, a percentage of relationships identified in the rule, etc.). In this case, client device 210 may process multiple relationships to determine whether the threshold quantity of relationships exists in the text portion. If the threshold quantity of relationships exists in the text portion, client device 210 may continue processing the rule. Otherwise, client device 210 may determine another rule to process (e.g., a next rule in the rules document).

In some implementations, the rule may include one or more logical operators (e.g., an AND operator, an OR operator, an XOR operator, etc.) that specify whether a particular text pattern and/or relationship must exist in order to satisfy the rule, whether a set of text patterns and/or relationships may alternatively exist in order to satisfy the rule, etc.

Client device 210 may apply the set of rules (e.g., identified in the rules document) to a text portion in a particular order. For example, the rules document may indicate an order for the set of rules to be processed (e.g., from top to bottom in the rules document). Client device 210 may apply rules to the text portion until a particular rule is satisfied by the text portion. If a text portion does not satisfy any of the rules in the set of rules, client device 210 may not categorize the text portion, and may process another text portion (e.g., a next sentence in the text document). If a text portion satisfies a rule, client device 210 may stop applying rules to the text portion, and may categorize the text portion based on the category identified in the satisfied rule.

In some implementations, client device 210 may continue to apply rules to the text portion when the text portion satisfies a rule (e.g., may apply all rules to the text portion). Client device 210 may use multiple categories to categorize the text portion when the text portion satisfies multiple rules. Additionally, or alternatively, client device 210 may select a particular category for categorizing the text portion (e.g., based on user input identifying the particular category and/or based on a category hierarchy). In some implementations, client device 210 may select a highest-level category or a lowest-level category for categorizing the text portion. For example, assume that client device 210 receives a categories document identifying a "performance" category with a "workload" sub-category. If client device 210 determines that a text portion satisfies a first rule for categorizing the text portion in the "performance" category, and satisfies a second rule for categorizing the text portion in the "workload" sub-category, client device 210 may categorize the text portion using both the "performance" and the "workload" categories, using only the "performance" category (e.g., the highest-level category), or using only the "workload" sub-category (e.g., the lowest-level category).

In some implementations, client device 210 may translate the rules document (e.g., written in a domain-specific language) into another syntax usable by a rules engine. For example, client device 210 may translate the rules document for use by a Java-based rules engine (e.g., Drools). Client device 210 may apply the translated rules document to the text document to be categorized.

As further shown in FIG. 6, process 600 may include providing information identifying the categorized portions of the text (block 660). For example, client device 210 may provide information identifying the categorized text portions. When a text portion satisfies a rule, client device 210 may store and/or provide information identifying the text portion and the category identified in the satisfied rule. In some implementations, client device 210 may store and/or provide a categorized text document that identifies text portions that satisfied a rule, and a category associated with each text portion. Client device 210 may provide the categorized text document when client device 210 has finished processing the text document (e.g., has finished applying the set of rules to all text portions included in the text document). Additionally, or alternatively, client device 210 may provide the categorized text document while client device 210 is processing the text document (e.g., after processing a text portion, after processing a rule that is satisfied, etc.). In some implementations, client device 210 may provide the categorized text document as a document containing comma-separated values (e.g., identifying the text portion, a label for the text portion, the category of the text portion, etc.).

Although FIG. 6 shows example blocks of process 600, in some implementations, process 600 may include additional blocks, different blocks, fewer blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. Example implementation 700 depicts an example of applying a rule to a text portion to categorize the text portion.

Figure 7A:
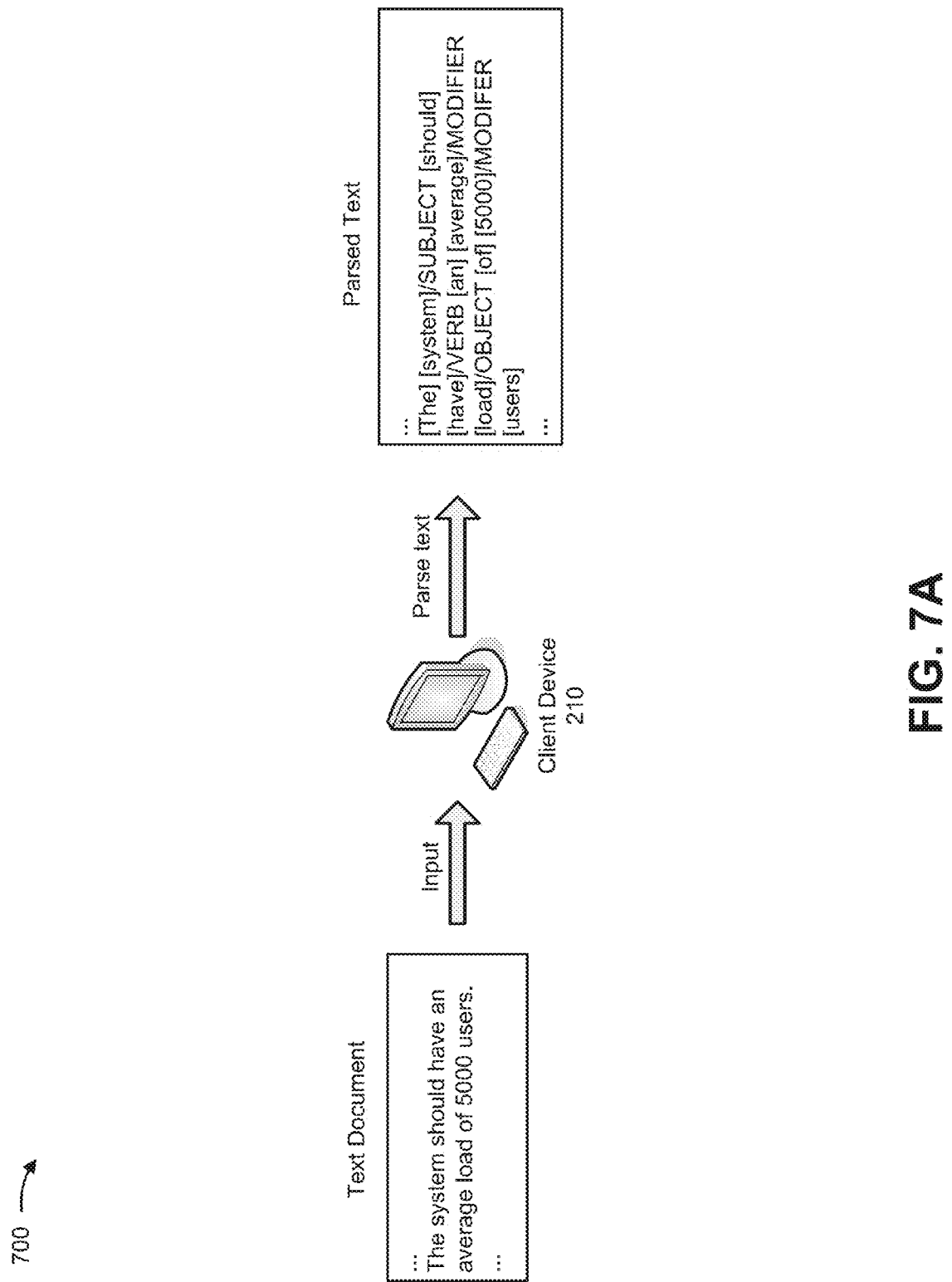
FIGS. 7A-7D are diagrams of an example implementation relating to the example process shown in FIG. 6.

As shown in FIG. 7A, client device 210 receives a text document. Assume that the text document includes multiple sentences, and that some of the sentences relate to non-functional requirements of a system under development. As shown, one of the sentences in the text document is "The system should have an average load of 5000 users." As further shown, client device 210 tokenizes the text in the text document to separate the text into words, indicated by brackets surrounding each word. As further shown, client device 210 parses the text to determine links between the words, as indicated by a forward slash (/) following a word in brackets. For example, client device 210 determines that "system" is the subject of the sentence, "have" is the verb of the sentence, "load" is the object of the sentence, and "average" and "5000" are modifiers.

Figure 7B:
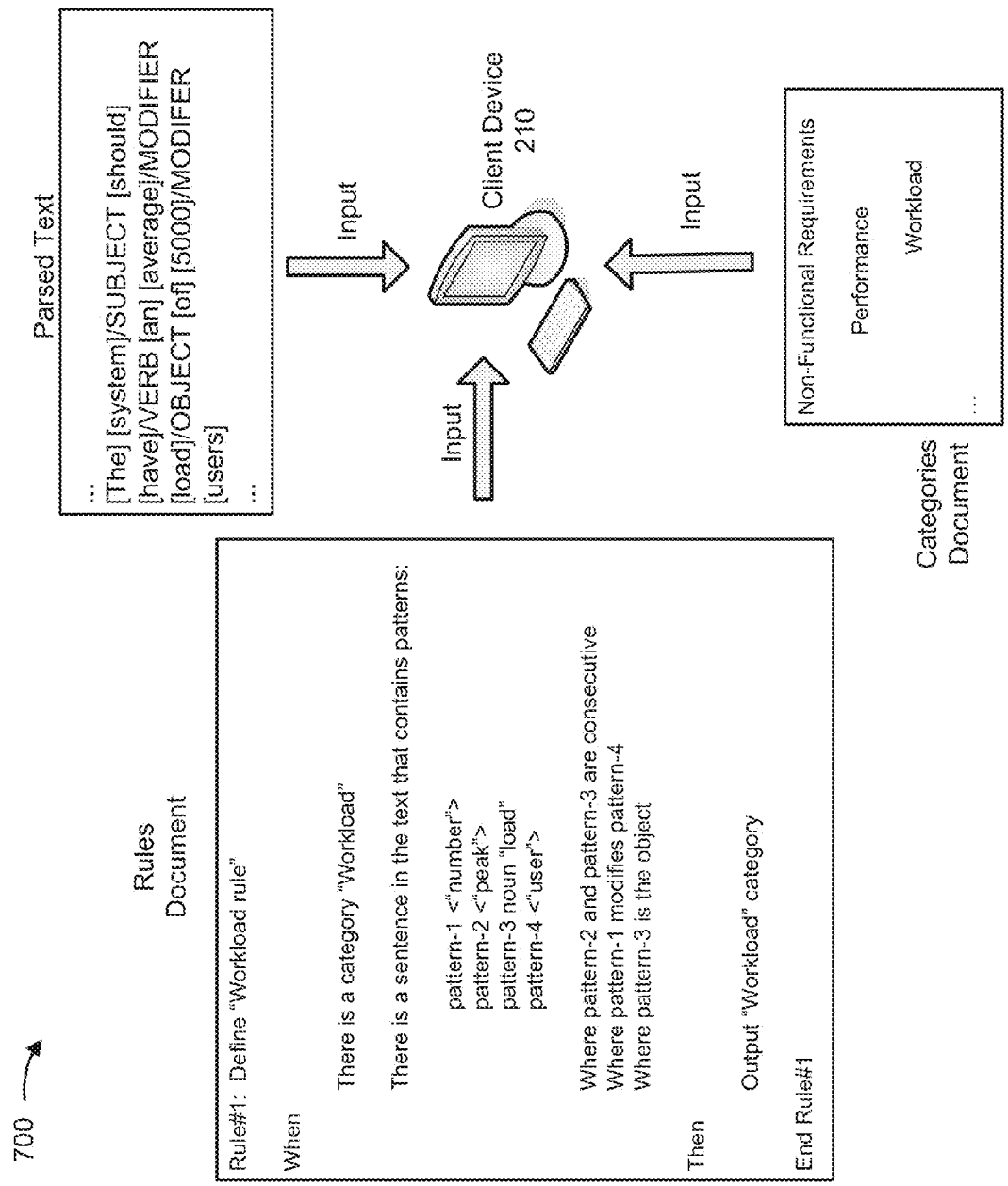

As shown in FIG. 7B, in addition to receiving the parsed text as input, client device 210 also receives a rules document and a categories document as input. The categories document identifies a set of categories for categorizing sentences into non-functional requirement categories. Assume that the categories document includes a "performance" category and a "workload" sub-category under the "performance" category, as shown. Further assume that the rules document includes the following rule:

```
Rule#1: Define "Workload rule"
    When
        There is a category "Workload"
        There is a sentence in the text which contains patterns
            pattern-1 <"number">
            pattern-2 <"peak">
            pattern-3 noun "load"
            pattern-4 < "user">
        Where pattern-2 and pattern-3 are consecutive
        Where pattern-1 modifies pattern-4
        Where pattern-3 is the object
    Then
        Output "Workload" category
End Rule#1.
```

Figure 7C:
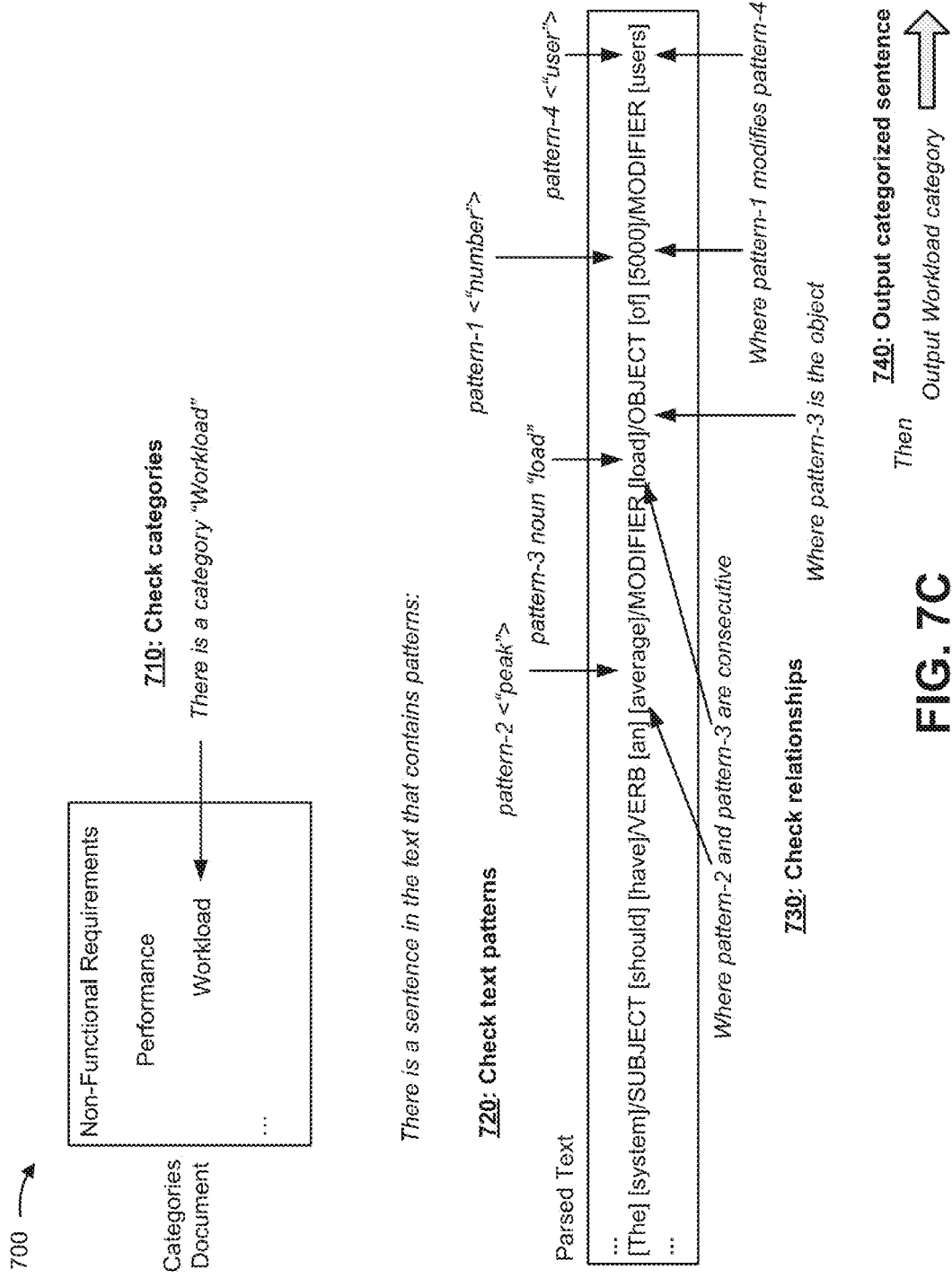

FIG. 7C shows how client device 210 applies the above rule to the sentence "The system should have an average load of 5000 users." As shown by reference number 710, client device 210 determines whether the "workload" category, identified in the rule, exists in the input categories document. Assume that the "workload" category does exist in the categories document, as shown. Because the "workload" category exists in the categories document, client device 210 continues applying the rule to the sentence. If the "workload" category did not exist (e.g., was not identified) in the categories document, client device 210 would process the next rule in the rules document (or, if the last rule had been processed, client device 210 would process the next sentence in the text document until all specified sentences have been processed).

As shown by reference number 720, client device 210 determines whether the text patterns, identified in the rule, appear in the sentence being processed. As shown, assume that client device 210 determines that pattern-1, the <"number"> semantic pattern, appears in the sentence as the word "5000." Further, assume that client device 210 determines that pattern-2, the <"peak"> semantic pattern, appears in the sentence as the word "average." Further, assume that client device 210 determines that pattern-3, the noun "load" syntactic pattern, appears in the sentence as the word "load," and that the word "load" is used as a noun in the sentence. Finally, assume that client device 210 determines that pattern-4, the <"user"> pattern, appears in the sentence as the word "users." Thus, client device 210 has determined that all of the text patterns, identified in the rule, appear in the sentence, and client device 210 continues applying the rule to the sentence.

As shown by reference number 730, client device 210 determines whether the relationships, identified in the rule, exist in the sentence being processed. As shown, assume that client device 210 determines that the immediate positional relationship "where pattern-2 and pattern-3 are consecutive" exists in the sentence because the word "average" (pattern-2) appears immediately before the word "load" (pattern-3) in the sentence. Further, assume that client device 210 determines that the grammatical relationship "where pattern-1 modifies pattern-4" exists in the sentence because the word "5000" (pattern-1) modifies the word "users" (pattern-4) in the sentence. Finally, assume that client device 210 determines that the grammatical relationship "where pattern-3 is the object" exists in the sentence because the word "load" (pattern-3) is the object of the sentence (e.g., has a verb-object relationship with the verb "have"). Thus, client device 210 has determined that all of the relationships, identified in the rule, appear in the sentence, and client device 210 continues applying the rule to the sentence.

Figure 7D:
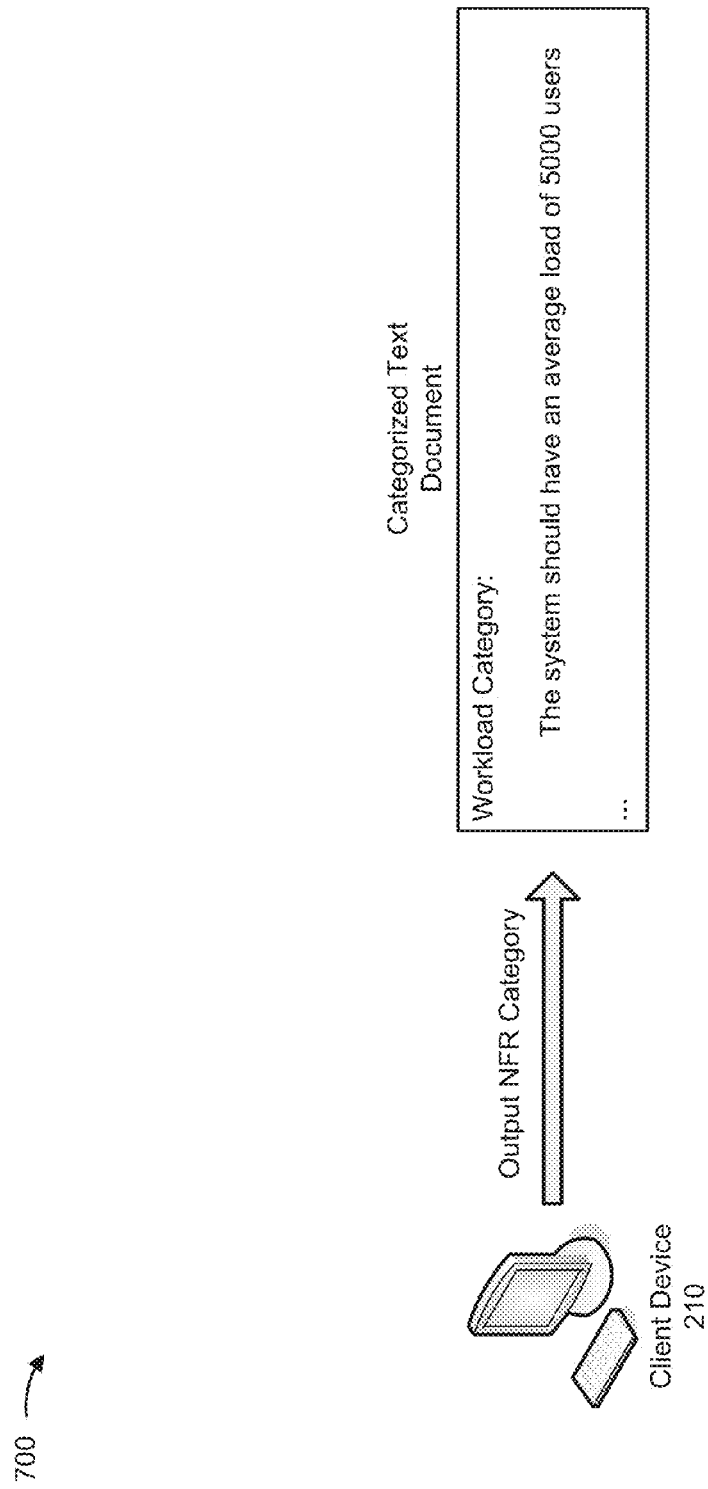

As shown by reference number 740, client device 210 determines that all specified conditions (e.g., text patterns, relationships, etc.) of the rule have been satisfied, and outputs the categorized sentence. As shown in FIG. 7D, client device 210 outputs the categorized sentence in a categorized text document that identifies the sentence "The system should have an average load of 5000 users" as being categorized in the "workload" category.

As indicated above, FIGS. 7A-7D are provided merely as an example. Other examples are possible and may differ from what was described with regard to FIGS. 7A-7D.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   determining, by a device, text to be categorized,
      the device comprising a memory and a processor,
      the text being included in a document relating to designing a system, and
      the document identifying one or more functional requirements of the system and one or more non-functional requirements of the system;
   retrieving, by the device and based on a first request of a user associated with the device, a categories document that identifies a set of categories from a first memory location at which the categories document is stored,
      the first request of the user identifying at least one of:
         the categories document, or
         the first memory location;
   determining, by the device and based on retrieving the categories document, the set of categories for categorizing one or more portions of the text;
   retrieving, by the device based on a second request of the user and from a second memory location at which a rules document is stored, the rules document that identifies a set of rules for categorizing the one or more portions of the text into one or more categories of the set of categories,
      the second memory location being externally remote from the device, and
      the second request of the user identifying at least one of:
         the rules document, or
         the second memory location;
   determining, by the device and based on retrieving the rules document, the set of rules for categorizing the one or more portions of the text,
      at least one rule, of the set of rules, identifying:
         a category of the set of categories,
         at least two text patterns to be used to categorize the one or more portions of the text into the category, and
         a relationship, between the at least two text patterns, to be used to categorize the one or more portions of the text into the category;
   determining, by the device, that a text portion, of the one or more portions of the text, includes the at least two text patterns and the relationship between the at least two text patterns;
   categorizing, by the device and based on determining that the text portion includes the at least two text patterns and the relationship between the at least two text patterns, the text portion into the category by:
      using the set of categories and the set of rules, and
      applying the at least one rule to the text portion,
         the category relating to a non-functional requirement of the one or more non-functional requirements of the system; and
   providing, by the device and based on categorizing the text portion into the category, a categorized text document identifying the text portion and the category,
      the categorized text document identifying the non-functional requirement.

2. The method of claim 1, where the relationship includes a positional relationship that indicates an order in which the at least two text patterns are positioned in the text portion relative to each other;

where determining that the text portion includes the at least two text patterns and the relationship comprises:
determining that the text portion includes the at least two text patterns in the order indicated by the positional relationship; and
where categorizing the text portion into the category comprises:
categorizing the text portion into the category based on determining that the text portion includes the at least two text patterns in the order indicated by the positional relationship.

3. The method of claim 1, where the relationship includes an immediate positional relationship that indicates an order in which the at least two text patterns are positioned in the text portion without intervening terms;
where determining that the text portion includes the at least two text patterns and the relationship comprises:
determining that the text portion includes the at least two text patterns in the order, indicated by the immediate positional relationship, without intervening terms; and
where categorizing the text portion into the category comprises:
categorizing the text portion into the category based on determining that the text portion includes the at least two text patterns in the order, indicated by the immediate positional relationship, without intervening terms.

4. The method of claim 1, where the relationship includes a grammatical relationship between the at least two text patterns;
where the method further comprises:
determining that the grammatical relationship exists between the at least two text patterns in the text portion; and
where categorizing the text portion into the category comprises:
categorizing the text portion into the category based on determining that the grammatical relationship exists between the at least two text patterns in the text portion.

5. The method of claim 1, where a text pattern, of the at least two text patterns, identifies a term;
where determining that the text portion includes the at least two text patterns and the relationship comprises:
determining that the text portion includes the term; and
where categorizing the text portion into the category comprises:
categorizing the text portion into the category based on determining that the text portion includes the term.

6. The method of claim 1, where a text pattern, of the at least two text patterns, identifies an indicator term that represents a plurality of terms;
where determining that the text portion includes the at least two text patterns and the relationship comprises:
determining that the text portion includes at least one term of the plurality of terms represented by the indicator term; and
where categorizing the text portion into the category comprises:
categorizing the text portion into the category based on determining that the text portion includes the at least one term of the plurality of terms represented by the indicator term.

7. The method of claim 1, where:
the set of categories includes a plurality of non-functional requirement categories, and
the one or more portions of the text includes a plurality of sentences;
where categorizing the text portion into the category comprises:
categorizing a sentence, of the plurality of sentences, into a non-functional requirement category of the plurality of non-functional requirement categories; and
where providing the categorized text document identifying the text portion and the category comprises:
providing the categorized text document identifying the sentence and the non-functional requirement category.

8. A non-transitory computer-readable medium storing instructions, the instructions comprising:
one or more instructions that, when executed by one or more processors of a device, cause the one or more processors to:
obtain text to be categorized,
the text being included in a document relating to designing a system,
the document identifying one or more functional requirements of the system and one or more non-functional requirements of the system;
retrieve, based on a request of a user and from a memory location at which a rules document is stored, the rules document that identifies a plurality of rules for categorizing the text into one or more categories of a set of categories,
the memory location being externally remote from the device, and
the request of the user including at least one of:
the rules document, or
the memory location;
determine, based on retrieving the rules document, the plurality of rules for categorizing one or more portions of the text,
at least one rule, of the plurality of rules, specifying:
a plurality of text patterns to be used to categorize the one or more portions of the text into the one or more categories, and
a relationship, between at least two text patterns of the plurality of text patterns, to be used to categorize the one or more portions of the text into the one or more categories;
determine that the plurality of text patterns and the relationship between the at least two text patterns exist in a text portion of the one or more portions of the text;
categorize, based on determining that the plurality of text patterns and the relationship between the at least two text patterns exist in the text portion, the text portion into the one or more categories by:
using the set of categories and the plurality of rules, and
applying the at least one rule to the text portion,
the one or more categories relating to a non-functional requirement of the one or more non-functional requirements of the system; and
provide, based on categorizing the text portion into the one or more categories, a categorized text document identifying the text portion and the one or more categories,
the categorized text document identifying the non-functional requirement.

9. The non-transitory computer-readable medium of claim 8, where the relationship includes at least one of:

a positional relationship that specifies a first order in which the at least two text patterns are to be positioned in the text portion relative to each other, an immediate positional relationship that specifies a second order in which the at least two text patterns are to be positioned in the text portion without intervening terms, or a grammatical relationship that is to exist between the at least two text patterns;

where the one or more instructions, that cause the one or more processors to determine that the plurality of text patterns and the relationship between the at least two text patterns exist in the text portion, cause the one or more processors to:

determine that the positional relationship, the immediate positional relationship, or the grammatical relationship exists between the at least two text patterns; and where the one or more instructions, that cause the one or more processors to categorize the text portion into the one or more categories, cause the one or more processors to:

categorize the text portion into the one or more categories based on determining that the positional relationship, the immediate positional relationship, or the grammatical relationship exists between the at least two text patterns.

10. The non-transitory computer-readable medium of claim 8, where a text pattern, of the plurality of text patterns, identifies at least one of:

a first term, a second term associated with a part of speech, or a plurality of terms;

where the one or more instructions, that cause the one or more processors to determine that the plurality of text patterns and the relationship between the at least two text patterns exist in the text portion, cause the one or more processors to:

determine that the first term, the second term associated with the part of speech, or the plurality of terms exist in the text portion; and where the one or more instructions, that cause the one or more processors to categorize the text portion into the one or more categories, cause the one or more processors to:

categorize the text portion into the one or more categories based on determining that the first term, the second term associated with the part of speech, or the plurality of terms exist in the text portion.

11. The non-transitory computer-readable medium of claim 8, where the one or more instructions, when executed by the one or more processors, further cause the one or more processors to:

parse the text portion to determine one or more relationships between the plurality of text patterns included in the text portion; and where the one or more instructions, that cause the one or more processors to determine that the plurality of text patterns and the relationship between the at least two text patterns exist in the text portion, cause the one or more processors to:

determine that the relationship between the at least two text patterns exists in the text portion based on parsing the text portion.

12. The non-transitory computer-readable medium of claim 8, where the one or more instructions, when executed by the one or more processors, further cause the one or more processors to:

retrieve a categories document identifying the one or more categories; and determine that a category is included in the one or more categories; and where the one or more instructions, that cause the one or more processors to categorize the text portion into the one or more categories, cause the one or more processors to:

categorize the text portion into the category based on retrieving the categories document and determining that the category is included in the one or more categories.

13. The non-transitory computer-readable medium of claim 8, where the at least one rule is a first rule;

where the one or more instructions, when executed by the one or more processors, further cause the one or more processors to:

determine that the text portion satisfies a second rule of the plurality of rules, the second rule being different from the first rule; and categorize the text portion into a category of the one or more categories based on determining that the text portion satisfies the second rule; and where the one or more instructions, that cause the one or more processor to provide the categorized text document identifying the text portion and the one or more categories, cause the one or more processors to:

provide the categorized text document, the categorized text document indicating an association between the text portion and the category.

14. A device, comprising:

a memory; and one or more processors to:

obtain text to be categorized, the text being included in a document relating to designing a system, the document identifying one or more functional requirements of the system and one or more non-functional requirements of the system;

retrieve, based on a request of a user and from a memory location at which a rules document is stored, the rules document that identifies a plurality of rules for categorizing one or more portion of text into one or more categories, the memory location being externally remote from the device, and the request of the user identifying at least one of:

the rules document, or the memory location;

determine, based on retrieving the rules document, the plurality of rules for categorizing one or more portions of the text into one or more categories of a set of categories, a rule, of the plurality of rules, specifying:

a plurality of text patterns to be used to assign the one or more portions of the text to a category of the one or more categories, a relationship, between at least two text patterns of the plurality of text patterns, to be used to assign the one or more portions of the text to the category, and another relationship between at least two other text patterns of the plurality of text patterns;

determine that a text portion, of the one or more portions of the text, includes the plurality of text patterns;

determine that the relationship, between the at least two text patterns, exists in the text portion;

determine that the rule is satisfied based on determining that the text portion includes the plurality of text patterns and determining that the relationship exists in the text portion;

assign, based on determining that the rule is satisfied, the text portion to the category by:
using the plurality of rules and the set of categories, applying the rule to the text portion,
the category relating to a non-functional requirement of the one or more non-functional requirements of the system; and provide, based on assigning the text portion to the category, a categorized document identifying the text portion, the category, and the non-functional requirement.

15. The device of claim 14, where the relationship includes at least one of:
a positional relationship that specifies an order in which the at least two text patterns are positioned in the text portion, or
a grammatical relationship between the at least two text patterns;
where the one or more processors, when determining that the relationship exists in the text portion, are to:
determine that the positional relationship, between the at least two text patterns, or the grammatical relationship, between the at least two text patterns, exists in the text portion; and
where the one or more processors, when determining that the rule is satisfied, are to:
determine that the rule is satisfied based on determining that the positional relationship, between the at least two text patterns, or the grammatical relationship, between the at least two text patterns, exists in the text portion.

16. The device of claim 14, where a text pattern, of the plurality of text patterns, identifies a term associated with a part of speech;
where the one or more processors, when determining that the text portion includes the plurality of text patterns, are to:
determine that the text portion includes the term; and
determine that the term is used as the part of speech in the text portion; and
where the one or more processors, when determining that the rule is satisfied, are to:
determine that the rule is satisfied based on determining that the text portion includes the term and based on determining that the term is used as the part of speech in the text portion.

17. The device of claim 14, where a text pattern, of the plurality of text patterns, identifies a plurality of terms;
where the one or more processors, when determining that the text portion includes the plurality of text patterns, are to:
determine that the text portion includes at least one of the plurality of terms; and
where the one or more processors, when determining that the rule is satisfied, are to:
determine that the rule is satisfied based on determining that the text portion includes at least one of the plurality of terms.

18. The device of claim 14, where the one or more processors are further to:
obtain a categories document identifying the set of categories;
determine that the category is included in the set of categories; and
where the one or more processors, when determining that the rule is satisfied, are to:
determine that the rule is satisfied based on obtaining the categories document and determining that the category is included in the set of categories.

19. The device of claim 18, where the set of categories includes a plurality of non-functional requirement categories;
where the one or more processors, when assigning the text portion to the category, are to:
assign the text portion to a non-functional requirement category of the plurality of non-functional requirement categories; and
where the one or more processors, when providing the categorized document identifying the text portion, the category, and the non-functional requirement, are to:
provide the categorized document identifying the text portion, the category, and the non-functional requirement category based on assigning the text portion to the non-functional requirement category.

20. The device of claim 14, where the one or more processors are further to:
lemmatize the text portion to determine one or more lemmatized terms; and
where the one or more processors, when determining that the text portion includes the plurality of text patterns, are to:
determine that the text portion includes the plurality of text patterns based on lemmatizing the text portion.

\* \* \* \* \*